United States Patent
Stark

(10) Patent No.: US 12,090,802 B2
(45) Date of Patent: *Sep. 17, 2024

(54) REUSABLE RIM FOR NON-PNEUMATIC TIRES

(71) Applicant: Bridgestone Americas Tire Operations, LLC, Nashville, TN (US)

(72) Inventor: Louis J. Stark, Kronenwetter, WI (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,475

(22) Filed: Aug. 24, 2023

(65) Prior Publication Data

US 2023/0391139 A1    Dec. 7, 2023

Related U.S. Application Data

(63) Continuation of application No. 17/260,765, filed as application No. PCT/US2019/041762 on Jul. 15, 2019, now Pat. No. 11,772,423.

(Continued)

(51) Int. Cl.
*B60C 7/24* (2006.01)
*B60B 25/00* (2006.01)
(Continued)

(52) U.S. Cl.
CPC ............. *B60C 7/24* (2013.01); *B60B 25/006* (2013.01); *B60B 25/045* (2013.01); *B60B 25/20* (2013.01);
(Continued)

(58) Field of Classification Search
CPC .. B60C 7/24; B60C 7/26; B60C 7/143; B60C 7/146; B60B 25/006; B60B 25/045;
(Continued)

(56) References Cited

U.S. PATENT DOCUMENTS

| 1,935,488 A | 11/1933 | Vaughn |
| 5,573,310 A | 11/1996 | Rollinson |

(Continued)

FOREIGN PATENT DOCUMENTS

| CA | 2261492 | 7/2000 |
| CA | 201371709 | 12/2009 |

(Continued)

OTHER PUBLICATIONS

International Search Report and Written Opinion; Corresponding PCT Application No. PCT/US2019/041762; Authorized Officer Chan Yoon Hwang; Oct. 31, 2019.

(Continued)

*Primary Examiner* — Kip T Kotter
(74) *Attorney, Agent, or Firm* — Shaun J. Fox; Bryan J. Jaketic

(57) ABSTRACT

A rim assembly for a non-pneumatic tire has at least two rim components including: a first rim component having a first rim flange and a first lip, and a second rim component having a second rim flange and a second lip. The rim assembly further includes a plurality of lateral rim component support structures configured to extend through a plurality of openings of a tire support structure. The rim assembly also includes a first plurality of fasteners securing the plurality of lateral rim component support structures to the first rim flange, and a second plurality of fasteners securing the plurality of lateral rim component support structures to the second rim flange.

20 Claims, 5 Drawing Sheets

Related U.S. Application Data

(60) Provisional application No. 62/711,030, filed on Jul. 27, 2018.

(51) Int. Cl.
    *B60B 25/04*     (2006.01)
    *B60B 25/20*     (2006.01)
    *B60C 7/14*     (2006.01)

(52) U.S. Cl.
    CPC .......... *B60C 7/143* (2013.01); *B60B 2310/60* (2013.01); *B60B 2320/14* (2013.01); *B60B 2360/102* (2013.01); *B60B 2360/104* (2013.01); *B60B 2360/3416* (2013.01); *B60C 7/146* (2021.08)

(58) Field of Classification Search
    CPC . B60B 25/20; B60B 2310/60; B60B 2320/14; B60B 2360/102; B60B 2360/104; B60B 2360/3416; B60B 7/01
    See application file for complete search history.

(56) References Cited

U.S. PATENT DOCUMENTS

| | | | |
|---|---|---|---|
| 7,316,252 | B1 | 1/2008 | Heard |
| 7,878,600 | B2 | 2/2011 | Krantz |
| 8,292,018 | B2 | 10/2012 | Huang |
| 8,555,941 | B2 | 10/2013 | Perron et al. |
| 8,567,461 | B2 | 10/2013 | Williams et al. |
| 8,578,984 | B2 | 11/2013 | Hannah et al. |
| 8,714,220 | B2 | 5/2014 | Tso et al. |
| 8,757,228 | B2 | 6/2014 | Dutton |
| 9,266,506 | B2 | 2/2016 | Korus et al. |
| 9,283,810 | B2 | 3/2016 | Korus et al. |
| 9,358,835 | B2 | 6/2016 | McKay |
| 9,511,625 | B2 | 12/2016 | Nishida et al. |
| 9,511,631 | B2 | 12/2016 | Fudemoto et al. |
| 9,511,632 | B2 | 12/2016 | Fudemoto et al. |
| 9,623,702 | B2 | 4/2017 | Fudemoto et al. |
| 9,662,933 | B2 | 5/2017 | Kamp et al. |
| 9,662,939 | B2 | 5/2017 | Manesh et al. |
| 11,772,423 | B2 * | 10/2023 | Stark ..................... B60B 25/045 152/11 |
| 2008/0314486 | A1 | 12/2008 | Manesh et al. |
| 2009/0211677 | A1 | 8/2009 | Palinkas et al. |
| 2009/0211681 | A1 | 8/2009 | Palinkas et al. |
| 2010/0038957 | A1 | 2/2010 | Henline |
| 2010/0084910 | A1 | 4/2010 | Botes et al. |
| 2012/0205017 | A1 | 8/2012 | Endicott |
| 2014/0251518 | A1 | 9/2014 | Abe et al. |
| 2015/0090379 | A1 | 4/2015 | Kemeny |
| 2016/0089935 | A1 | 3/2016 | Iwamura et al. |
| 2017/0015134 | A1 | 1/2017 | Ma |
| 2017/0015141 | A1 | 1/2017 | Shoji et al. |
| 2017/0087931 | A1 | 3/2017 | Gaylo et al. |
| 2018/0050567 | A1 | 2/2018 | Benzing, II et al. |
| 2018/0093528 | A1 | 4/2018 | Schaedler |
| 2018/0134072 | A1 | 5/2018 | Celik |
| 2019/0152256 | A1 | 5/2019 | Hwang et al. |
| 2019/0299709 | A1 | 10/2019 | Celik |
| 2020/0031166 | A1 | 1/2020 | Celik |
| 2020/0171884 | A1 | 6/2020 | Lee |

FOREIGN PATENT DOCUMENTS

| | | |
|---|---|---|
| CN | 101687433 | 3/2010 |
| JP | 2007331708 | 12/2007 |
| JP | 2011156905 A | 8/2011 |
| WO | 2009016933 | 2/2009 |
| WO | 2010046868 | 4/2010 |
| WO | 2011025491 | 3/2011 |
| WO | 2016123180 | 8/2016 |
| WO | 2017117598 | 7/2017 |

OTHER PUBLICATIONS

Supplementary European Search Report; Corresponding EP Application No. EP19841879; Dated Mar. 21, 2022.

European Search Report; Corresponding EP Application No. EP23184854; Dated Sep. 12, 2023.

* cited by examiner

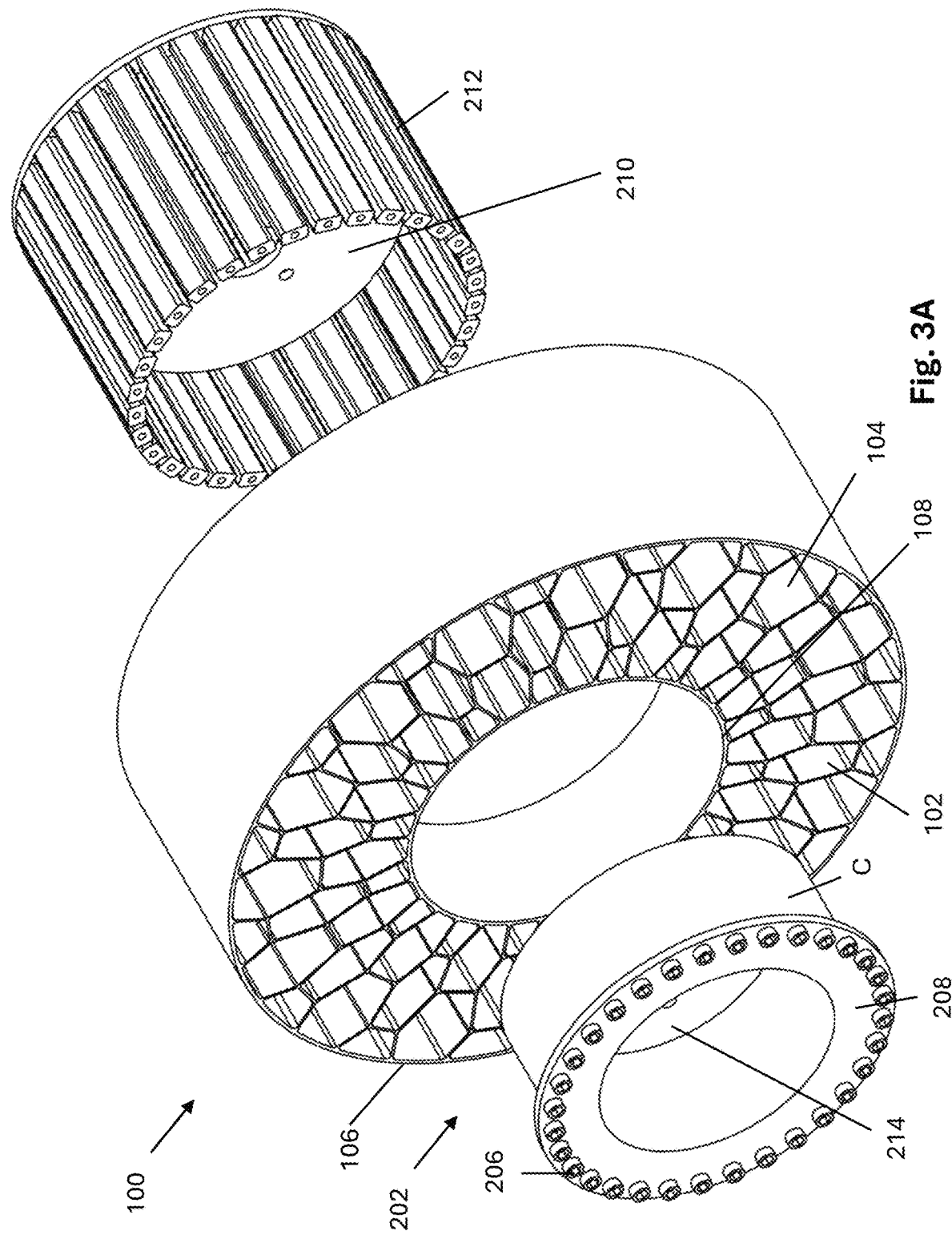

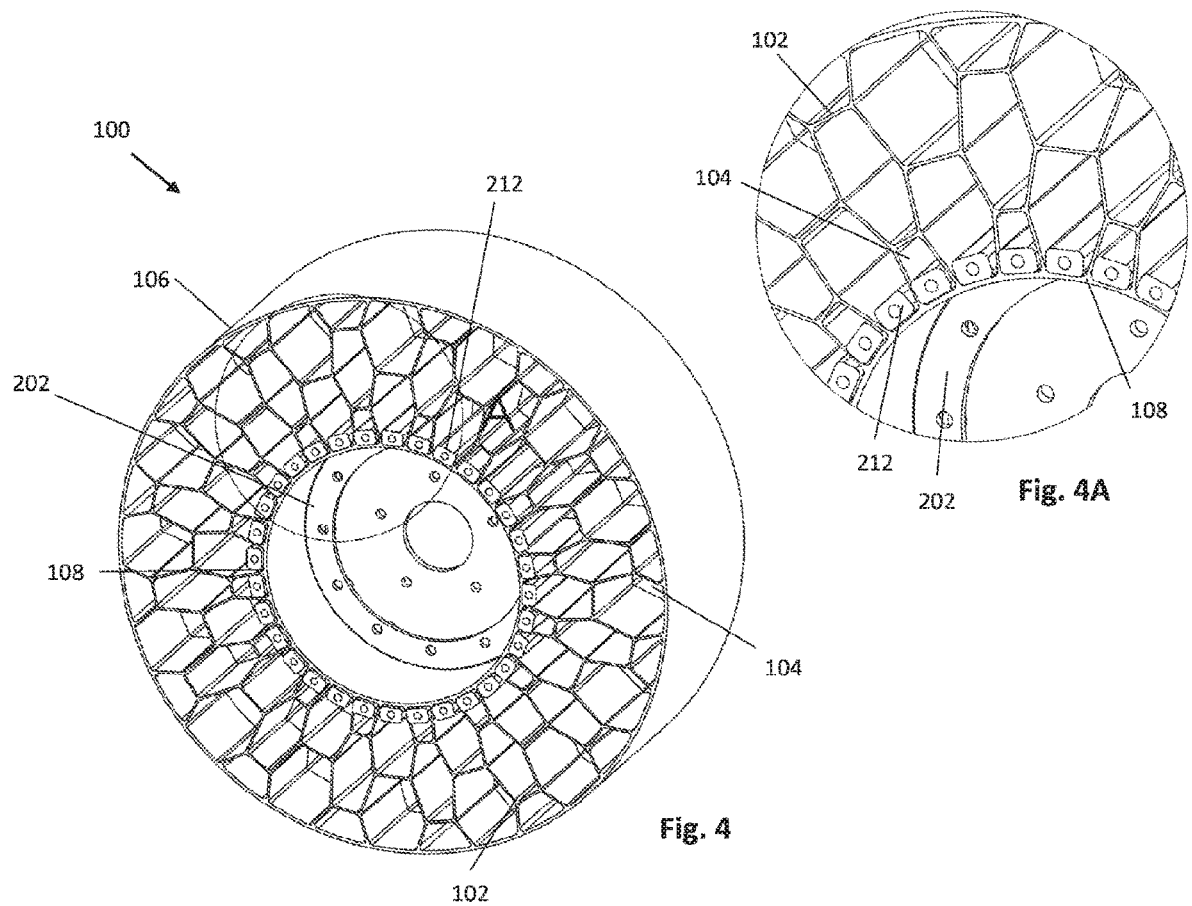

REUSABLE RIM FOR NON-PNEUMATIC TIRES

CROSS REFERENCE TO RELATED APPLICATIONS

This application is a continuation of U.S. patent application Ser. No. 17/260,765, filed on Jan. 15, 2021 as a National Stage Entry of PCT/US2019/041762, filed on Jul. 15, 2019, which claims the benefit of U.S. Provisional Patent Application No. 62/711,030, filed on Jul. 27, 2018. The disclosures of these documents are incorporated by reference herein in their entirety.

FIELD OF INVENTION

The present disclosure is directed to reusable rims for non-pneumatic tires. More particularly, the present disclosure is directed to a reusable tire rim that can be inserted and removed from a non-pneumatic tire.

BACKGROUND

Current rim designs for non-pneumatic tires with support structures such as honeycomb or webbing geometry, are designed with a rim that adheres to the support structure with an adhesive such that the rim cannot be removed from the support structure without causing damage to the rim or support structure. When the tire reaches its end of life, the rim cannot be used again in a new tire as removing the adhesive destroys the rim. As tires and tire designs become larger, the cost of the non-reusable tires will also increase.

SUMMARY OF THE INVENTION

In one embodiment, a non-pneumatic tire and rim assembly includes a non-pneumatic tire having an annular inner ring with an axis of rotation, an annular outer ring, and a webbing extending between the annular inner ring and the annular outer ring. The webbing defines a plurality of openings. The non-pneumatic tire and rim assembly further includes a rim assembly having a first rim component and a second rim component. The first rim component includes a first rim flange and a first lip, wherein the first rim component extends partially through a first side of the annular inner ring. The second rim component includes a second rim flange and a second lip, wherein the second rim component extends partially through a second side of the annular inner ring. The rim assembly further includes a plurality of lateral rim component support structures extending through the plurality of openings of the webbing. A first plurality of fasteners secure the plurality of lateral rim component support structures to the first rim flange. A second plurality of fasteners secure the plurality of lateral rim component support structures to the second rim flange.

In another embodiment, a method of assembling a non-pneumatic tire and reusable rim assembly includes providing a non-pneumatic tire, providing a first rim component, and providing a second rim component. The non-pneumatic tire includes a support structure between an annular inner ring and an annular outer ring. The annular inner ring defines a central opening, and the support structure defines a plurality of openings. The first rim component includes a first rim flange and a first lip. The second rim component includes a second rim flange and a second lip. The method further includes providing a plurality of lateral rim component support structures, and securing the plurality of lateral rim component support structures to the first rim flange with a first plurality of fasteners. The method also includes inserting the plurality of lateral rim component support structures through the plurality of openings at a first side of the non-pneumatic tire and securing the plurality of lateral rim component support structures to the second rim flange at a second side of the non-pneumatic tire with a second plurality of fasteners. The method further includes securing a centrally located mounting plate to the first and second rim components with a third plurality of fasteners.

In yet another embodiment, a rim assembly for a non-pneumatic tire has at least two rim components including: a first rim component having a first rim flange and a first lip, and a second rim component having a second rim flange and a second lip. The rim assembly further includes a plurality of lateral rim component support structures configured to extend through a plurality of openings of a tire support structure. The rim assembly also includes a first plurality of fasteners securing the plurality of lateral rim component support structures to the first rim flange, and a second plurality of fasteners securing the plurality of lateral rim component support structures to the second rim flange.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 3A illustrates a partially assembled reusable rim before being inserted into the non-pneumatic tire;

FIG. 4 illustrates a perspective view of a partially assembled reusable rim inserted into the non-pneumatic tire; and FIG. 4A illustrates a detail view of a portion of FIG. 4.

DETAILED DESCRIPTION

The disclosure is described in the context of utilizing a reusable rim for a non-pneumatic tire.

Figure 1:
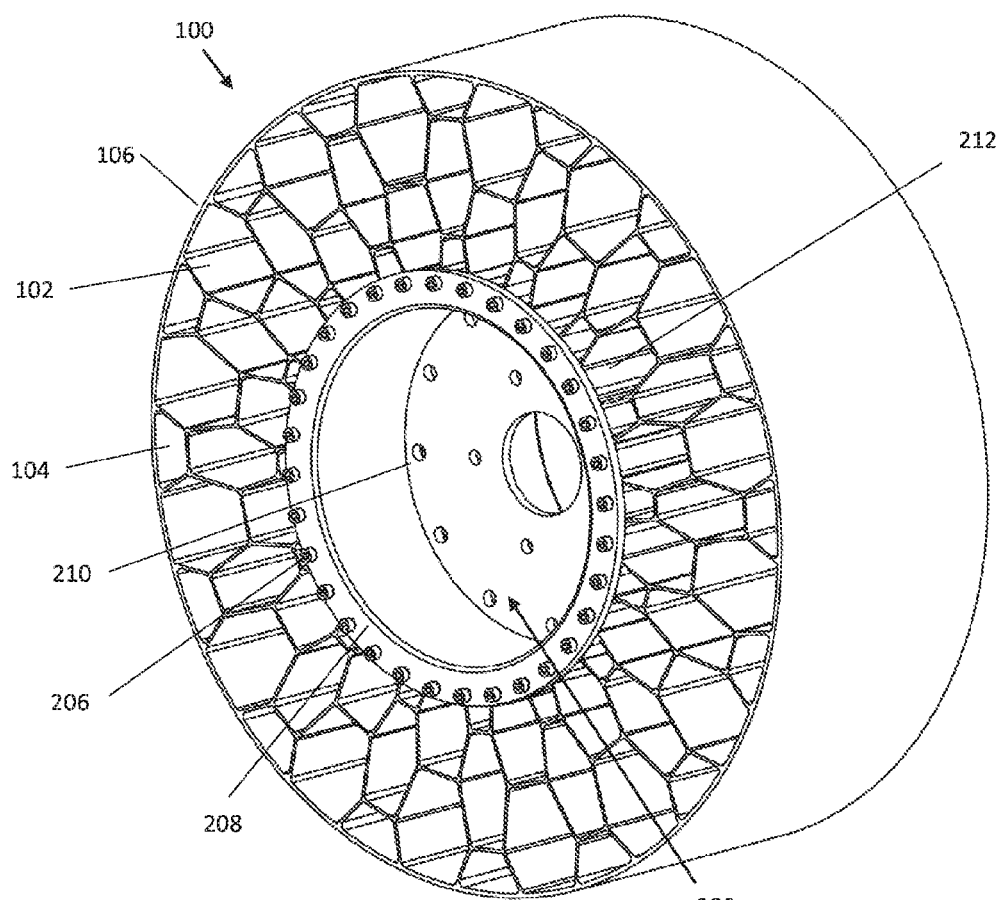
FIG. 1 illustrates a perspective view of an assembled non-pneumatic tire with an exemplary reusable rim.

FIG. 1 illustrates a perspective view of an assembled non-pneumatic tire 100 with a reusable rim assembly inserted and secured onto the tire. The non-pneumatic tire 100 includes an annular inner ring 108 (hidden in this view, but shown in FIGS. 3A and 3B) having an axis of rotation, an annular outer ring 106 and a webbing 102 extending between the annular inner ring 108 and the annular outer ring 106. In an alternative embodiment (not shown), a series of spokes may be used in place of the webbing. In another alternative embodiment (not shown), any connecting structure may be employed to connect the annular inner ring to the annular outer ring.

The webbing 102 includes a plurality of openings 104. In the illustrated embodiment, the plurality of openings 104 have a honeycomb geometry, including both hexagonal openings and trapezoid-shaped openings. In alternative embodiments, the openings may have any geometric shape.

The elements of the webbing 102 above an axis of rotation of the non-pneumatic tire 100 experience a tensile force, while the elements of the webbing 102 below the axis of rotation experience a compression force. In some embodiments, the elements of the webbing 102 below the axis of rotation may buckle from the compression force. The outer annular ring 106 can support the applied load on the non-pneumatic tire 100 as the applied load is transmitted by tension through the webbing 102. Accordingly, the outer annular ring 106 is sufficiently stiff to support the webbing 102 that is in tension and supporting the load. A substantial amount of the applied load may be supported by the plurality of the webbing working in tension. For example, in one embodiment, at least 75% of the load is supported in tension, in another embodiment at least 85% of the load is supported in tension and in another embodiment at least 95% of the load is supported in tension. In other embodiments, less than 75% of the load can be supported in tension.

The non-pneumatic tire 100 also includes a reusable rim assembly 200. The reusable rim assembly 200 includes a first rim flange 208 connected to a plurality of lateral rim component support structures 212 that extend through the plurality of openings 104 of the non-pneumatic tire webbing 102.

Figure 2:
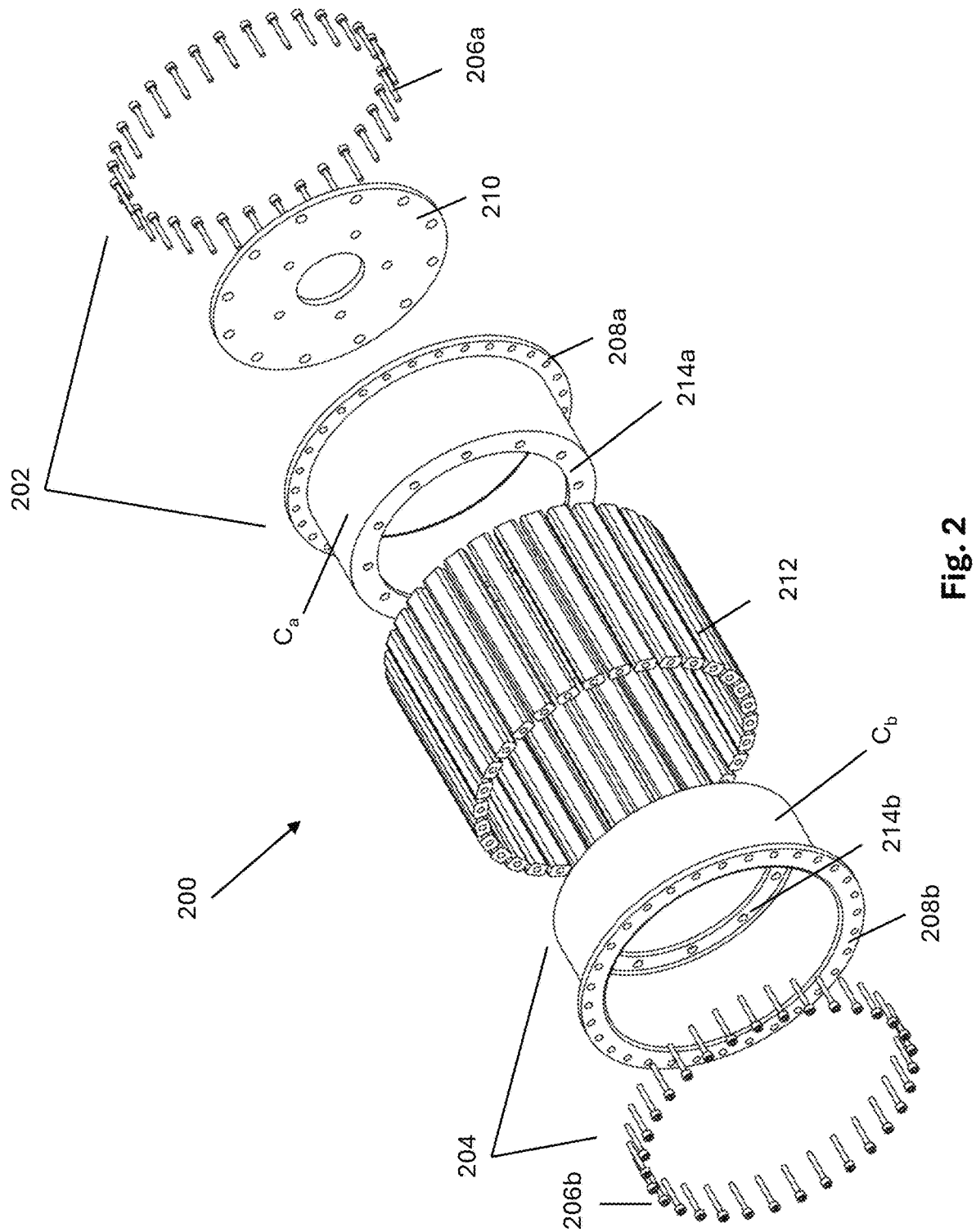
FIG. 2 illustrates an exploded view of the exemplary reusable rim.

FIG. 2 illustrates an exploded view of the rim assembly 200. The rim assembly 200 includes a first rim component 202 and a second rim component 204. The first rim component 202 includes a first rim flange 208a, a first cylindrical portion $C_a$ having a smooth outer surface, and a first lip 214a, and is configured to extend partially (not shown in this figure) through a first side of the annular inner ring 106 of the non-pneumatic tire 100. The second rim component 204 includes a second rim flange 208b, a second cylindrical portion $C_b$ having a smooth outer surface, and a second lip 214b, and the second rim component 204 is configured to extend partially through a second side of the annular inner ring 106 of the non-pneumatic tire 100.

The rim assembly 200 also includes a plurality of lateral rim component support structures 212. The plurality of lateral rim component support structures 212 are secured to the first rim component 202 and the second rim component 204 and inserted into the webbing 102 of the non-pneumatic tire 100. This secures the rim assembly 200 to the webbing 102 of the non-pneumatic tire 100. In one embodiment the plurality of lateral rim component support structures 212 are stainless steel cores. In another embodiment, the plurality of lateral rim component support structures 212 are aluminum cores. In another embodiment, the plurality of lateral rim component support structures 212 are powder coated steel. In another embodiment, the plurality of lateral rim component support structures 212 are carbon fiber composite.

The number of lateral rim component support structures 212 varies depending upon the geometry of the tire webbing 102. In one embodiment, the number of plurality of lateral rim component support structures 212 matches the number of openings in the webbing 102 of the non-pneumatic tire 100. In such an embodiment, each of the plurality of openings 104 in the non-pneumatic tire webbing 102 will have a lateral rim component support structure 212. In another embodiment, the number of plurality of lateral rim component support structures 212 equal less than the number of openings in the webbing 102 of the non-pneumatic tire 100 but still provide support to the overall webbing 102 allowing for a variable number of later rim component support structures 212 to be used. The dimensions of the plurality of lateral rim component support structures 212 varies with the geometry of the tire support structure. The plurality of lateral rim component support structures 212 can be dimensioned to fit snugly in the openings of the geometry of the tire support structure or there can be gaps between the structures and the webbing. In yet another embodiment, at least one of the openings had two or more lateral rim component support structures disposed therethrough.

A first plurality of fasteners 206a and a second plurality of fasteners 206b secure the plurality of lateral rim component support structures 212 to the rim assembly when the plurality of lateral rim component support structures 212 are inserted into the webbing 102 of the non-pneumatic tire 100. In one embodiment, the first plurality of fasteners 206a and the second plurality of fasteners 206b are screws. In another embodiment, the first plurality of fasteners 206a and the second plurality of fasteners 206b are locking bolts. In one particular embodiment, the fasteners 206a, 206b do not require specialized tools, but can be fastened by a standard tool such as a screwdriver or socket wrench. In an alternative embodiment, the fasteners 206a, 206b may be adapted to be used by specialized tools to prevent removal by unauthorized individuals.

The lateral rim component support structures 212 may be attached to the non-pneumatic tire such that they exert a radial force on the on the annular inner ring 108. Such a force would compress the annular inner ring 108 and may further apply a tensile force on the tire webbing 102. Alternatively, the lateral rim component support structure may not exert a force against the annular inner ring. In either embodiment, the lateral rim component support structures 212 apply a torque to the tire webbing 102 during rotation of the rim assembly.

A locking plate 210 is affixed to the first rim lip 214a and second rim lip 214b lips. The locking plate 210 is interchangeable. In one embodiment, the locking plate 210 is centrally located. In another embodiment, the locking plate 210 is offset from center within the rim assembly 200. The assembled rim assembly 200 can be inserted and locked to a tire support structure without the need of adhesive or other additional bonding agents aside from the fasteners. When the tire 100 and the rim assembly 200 are mounted to a vehicle, the vehicle axes will turn the rim and cause the plurality of lateral rim component support structures 212 to exert a force against the webbing 102 of the tire 100 causing the tire 100 to rotate.

Figure 3B:
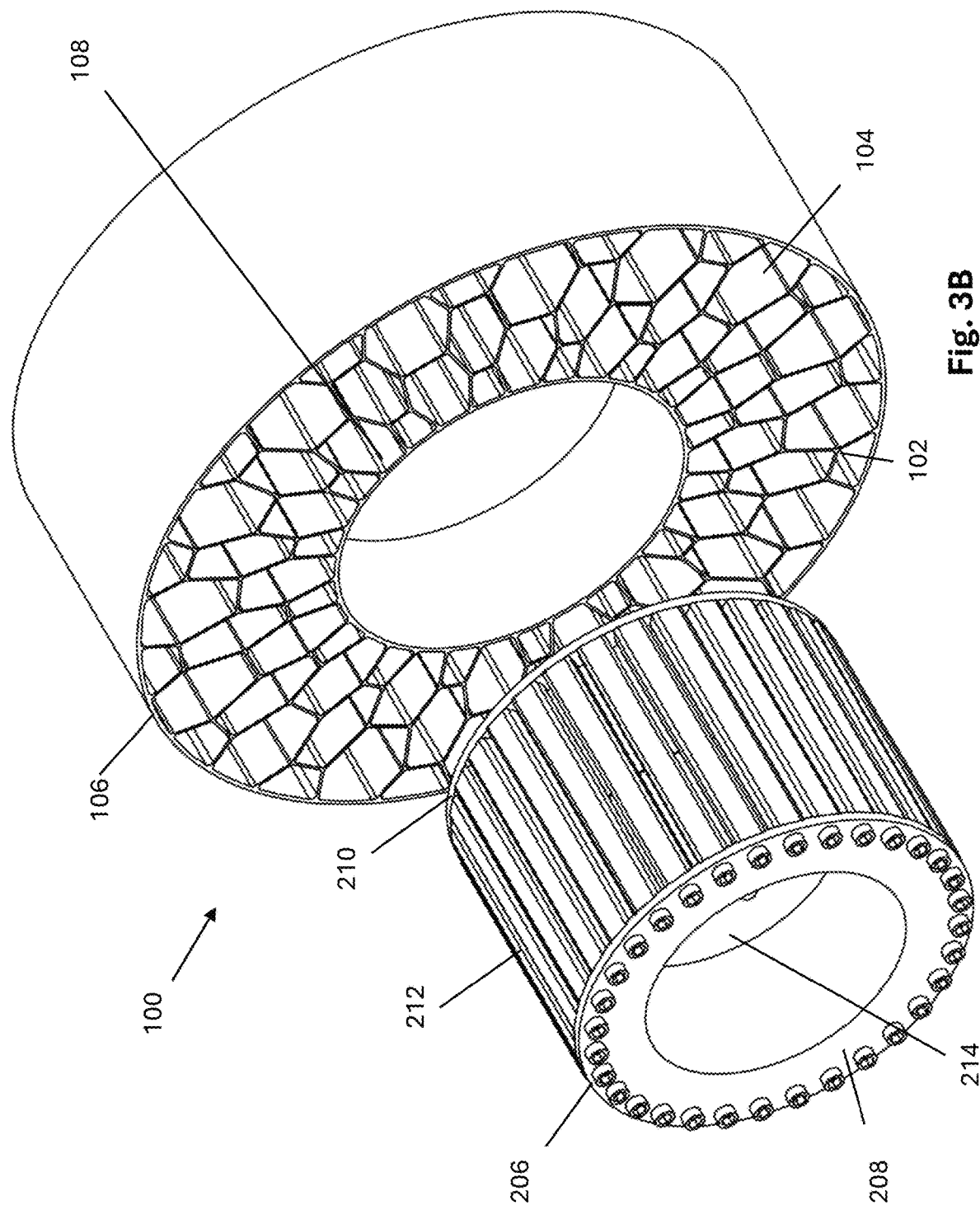
FIG. 3B illustrates an assembled reusable rim separate from the non-pneumatic tire, wherein the components of the reusable rim would be inserted into the non-pneumatic tire during assembly.

FIG. 3A illustrates a partially assembled reusable rim before it is inserted into the non-pneumatic tire. The plurality of lateral rim component support structures 212 are secured to a locking plate 210 using a second plurality of fasteners (not shown in this view). The plurality of lateral rim component support structures 212 are inserted into the webbing 102 around the inner annular ring 108 and the plurality of lateral rim component support structures 212 is secured to a rim flange 208 of a rim component 202 using a set of fasteners 206. The rim component 202 has a cylindrical portion C with a smooth outer surface that extends through a central opening of the non-pneumatic tire 100. The locking plate 210 is secured to a lip 214 of the rim component 202. The lip 214 extends radially inward from an end of the rim component 202. As is further shown in FIG. 3B, the cylindrical reusable rim can be completely removed from the webbing 102 of the non-pneumatic tire.

FIG. 4 illustrates a perspective view of a partially assembled reusable rim 200 inserted into the non-pneumatic tire 100, and FIG. 4A illustrates a detail view of a portion of FIG. 4. As can be seen in these figures, the partially assembled reusable rim 200 is inserted into the non-pneumatic tire 100 such that the lateral rim component support structures 212 extend through the openings 104 adjacent the inner annular ring 108 and the rim flange of the first rim component 202 is in contact with a side of the tire. After the lateral rim component support structures 212 have been inserted through the openings 104, the second rim component (not shown in this view) may then be aligned with and fastened to the first rim component 202 and the lateral rim component support structures 212.

In the illustrated embodiment, the lateral rim component support structures 212 are shaped to correspond to the profile of the web shape as close as possible to efficiently transfer the load from the web to the rim. Therefore, in alternative embodiments in which the openings vary in size, the shape of the lateral rim component support structures may also vary in shape. In another alternative embodiment, however, the shape of the lateral rim component structures may differ significantly from the profile of the web.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A non-pneumatic tire and rim assembly, comprising:
    a non-pneumatic tire including:
        an annular inner ring having an axis of rotation and a smooth inner surface;
        an annular outer ring; and
        a connecting structure extending between the annular inner ring and the annular outer ring, the connecting structure defining a plurality of openings;
    a rim assembly including:
        a first rim component, the first rim component including a cylindrical portion having a smooth outer surface, a rim flange extending radially outwards from a first end of the cylindrical portion, and a lip extending radially inwards from a second end of the cylindrical portion, wherein the first rim component extends through the annular inner ring, and
        a locking plate connected to the lip of the first rim component;
    a plurality of lateral rim component support structures secured to the locking plate and extending through the plurality of openings of the connecting structure;
    a plurality of fasteners securing the plurality of lateral rim component support structures to the rim flange.

2. The non-pneumatic tire and rim assembly of claim 1, wherein the connecting structure is a webbing.

3. The non-pneumatic tire and rim assembly of claim 1, wherein the connecting structure includes a plurality of spokes.

4. The non-pneumatic tire and rim assembly of claim 1, wherein the plurality of lateral rim component support structures is configured to apply a torque to the connecting structure during rotation of the rim assembly.

5. The non-pneumatic tire and rim assembly of claim 1, wherein the lateral rim component support structures are interchangeable to correspond to the openings defined by the connecting structure.

6. The non-pneumatic tire and rim assembly of claim 1, wherein the number of lateral rim component support structures is less than the number of openings defined by the connecting structure.

7. The non-pneumatic tire and rim assembly of claim 1, wherein the lateral rim component support structures have different dimensions corresponding to the openings defined by the connecting structure.

8. The non-pneumatic tire and rim assembly of claim 1, wherein the first rim component is configured to fit securely inside the annular inner ring.

9. The non-pneumatic tire and rim assembly of claim 1, wherein the plurality of lateral rim component support structures are constructed of a material selected from the group consisting of stainless steel, powder coated steel, carbon fiber composite, and aluminum.

10. A method of assembling a non-pneumatic tire and reusable rim assembly, the method comprising:
    providing a non-pneumatic tire, the non-pneumatic tire including a connecting structure between an annular inner ring and an annular outer ring, wherein the annular inner ring has a smooth inner surface that defines a central opening and an axis of rotation, and wherein the connecting structure defines a plurality of openings;
    providing a first rim component, the first rim component including a cylindrical portion having a smooth outer surface, a rim flange extending radially outwards from a first end of the cylindrical portion, and a lip extending radially inwards from a second end of the cylindrical portion;
    providing a locking plate;
    providing a plurality of lateral rim component support structures;
    securing the plurality of lateral rim component support structures to the rim flange with a first plurality of fasteners;
    inserting the plurality of lateral rim component support structures through the plurality of openings at a first side of the non-pneumatic tire;
    securing the plurality of lateral rim component support structures to the locking plate at a second side of the non-pneumatic tire.

11. The method of claim 10, wherein the connecting structure is a webbing.

12. The method of claim 10, wherein the connecting structure includes a plurality of spokes.

13. The method of claim 10, wherein the plurality of lateral rim component support structures is configured to apply a torque to the connecting structure during rotation of the reusable rim assembly.

14. The method of claim 10, wherein the lateral rim component support structures are selected from a group of support structures having different dimensions corresponding to the openings defined by the connecting structure.

15. The method of claim 10, wherein the step of providing a plurality of lateral rim component support structures includes selecting a number of lateral rim component support structures that is less than the number of openings defined by the connecting structure.

16. A non-pneumatic tire and rim assembly, comprising:
a non-pneumatic tire including:
an annular inner ring having an axis of rotation;
an annular outer ring; and
a connecting structure extending between the annular inner ring and the annular outer ring, the connecting structure defining a plurality of openings;
a rim assembly including:
a first rim component, the first rim component including a rim flange extending radially outwards from a first end of the first rim component, and a lip extending radially inwards from a second end of the first rim component, wherein the first rim component extends through the annular inner ring;
a plurality of lateral rim component support structures extending through the plurality of openings of the connecting structure; and
a first plurality of fasteners securing the plurality of lateral rim component support structures to the rim flange.

17. The non-pneumatic tire and rim assembly of claim 16, wherein the lateral rim component support structures are interchangeable to correspond to the openings defined by the connecting structure.

18. The non-pneumatic tire and rim assembly of claim 16, wherein the number of lateral rim component support structures is less than the number of openings defined by the connecting structure.

19. The non-pneumatic tire and rim assembly of claim 16, wherein the lateral rim component support structures have different dimensions corresponding to the openings defined by the connecting structure.

20. The non-pneumatic tire and rim assembly of claim 16, wherein:
the annular inner ring has a smooth inner surface,
the first rim component has a cylindrical portion with a smooth outer surface, and
the first rim component is configured to fit securely inside the annular inner ring.

* * * * *